United States Patent [19]

Rath et al.

[11] 4,449,757

[45] May 22, 1984

[54] HYDRAULIC ACTUATOR FOR A VEHICLE INTERNAL SHOE-DRUM BRAKE

[75] Inventors: Heinrich B. Rath, Vallendar; Alfred W. Thomas, Koblenz, both of Fed. Rep. of Germany

[73] Assignee: Lucas Industries Limited, Birmingham, England

[21] Appl. No.: 294,432

[22] Filed: Aug. 20, 1981

[30] Foreign Application Priority Data

Aug. 23, 1980 [GB] United Kingdom ............... 8027508
Mar. 6, 1981 [GB] United Kingdom ............... 8107147

[51] Int. Cl.³ ..................... F16D 65/24; B60T 11/34
[52] U.S. Cl. .................................. 303/6 C; 188/349; 188/364
[58] Field of Search ............... 303/6 C; 188/349, 2 A, 188/196 A, 72.5, 72.4, 361, 325–334, 106 A, 204 R, 347, 351, 363, 364, 181 T, 216, 79.5 R; 60/591; 92/75; 91/29, 517, 422, 433, 468

[56] References Cited

U.S. PATENT DOCUMENTS

| 3,431,730 | 3/1969 | Bueler | 188/196 A X |
| 4,266,640 | 5/1981 | Woo | 188/363 |
| 4,286,504 | 9/1981 | Carré et al. | 188/364 X |
| 4,292,883 | 10/1981 | Riquart et al. | 91/29 |

FOREIGN PATENT DOCUMENTS

| 0005675 | 11/1979 | European Pat. Off. | |
| 13470 | 2/1956 | Fed. Rep. of Germany | 188/363 |
| 2426183 | 1/1980 | France | 188/364 |
| 1159876 | 7/1969 | United Kingdom | |

*Primary Examiner*—Douglas C. Butler
*Attorney, Agent, or Firm*—Scrivener, Clarke, Scrivener and Johnson

[57] ABSTRACT

An hydraulic actuator comprises a first piston and a second piston both working in a bore in a housing and the actuator incorporates a pressure proportioning valve. The valve comprises a valve head for engagement with a seating, first and second stems projecting from the head and through the first piston in each of two opposite directions, each stem being of an area smaller than that of the head, a seal between the first stem and the first piston, a first spring acting between an abutment adjacent to the seal and a shoulder on the first stem to urge the head in a first direction away from the seating and into engagement with a stop, and a second spring acting on an enlargement on the second stem also to urge the head in the first direction and to augment the force in the first spring. The second piston is provided with a longitudinally extending recess into which the second stem and the second spring both project.

7 Claims, 3 Drawing Figures

HYDRAULIC ACTUATOR FOR A VEHICLE INTERNAL SHOE-DRUM BRAKE

SPECIFIC DESCRIPTION

This invention relates to an hydraulic actuator for a vehicle internal shoe-drum brake of the kind in which fluid in a pressure chamber acts between relatively movable parts of a piston and cylinder assembly to separate adjacent ends of a pair of brake shoes and urge friction linings carried by the shoes into engagement with a rotatable drum.

In vehicle hydraulic braking systems it is known to provide a pressure proportioning valve which modifies the hydraulic pressure applied to brakes on the rear wheels to maintain the correct ratio of braking effort of brakes on the front wheel to the brakes on the rear wheels during severe braking. In known constructions the valve is located in the line to the rear wheel brakes, but this involves an extra component which increases the initial expense and the cost of maintenance.

In a different known construction disclosed in French Patent Publication No. 2426183, a pressure proportioning valve is incorporated in an hydraulic actuator of the kind set forth to control communication between pressure spaces constituted by the pressure chamber with each respective relatively movable part subjected to pressure in one respective pressure space. The valve is normally open to equalise the pressure in the pressure spaces, and the valve closes at a first predetermined pressure to cut-off the fluid supply to one pressure space, so that further increase in pressure is operative only in the other pressure space, which reduces the torque generated by the brake. At a second predetermined pressure the valve opens again, and thereafter acts to maintain a constant pressure differential between the two pressure spaces. This has the advantage of incorporating the valve in the actuator, and also makes it possible, for normal forward rotation of a wheel, to apply more pressure to the trailing shoe than to the leading shoe, in a brake of the one-leading one-trailing shoe type which normally constitutes the brake on a rear wheel of a vehicle. This tends to equalise the torque generated by the shoes, but has the disadvantage that the valve has to be relatively complex to operate in this way. In consequence the valve requires a relatively large amount of space in the actuator which has the effect of increasing substantially the axial length of the actuator with the necessity of having to provide an equivalent increase in available space in the critical region of the shoe-ends.

In the specific construction disclosed in published European Patent Application No. 0005675 opposed pistons work in a bore in a common housing and a proportioning valve is incorporated in one of the pistons. The proportioning valve comprises a differential piston working in a stepped bore in the said one piston, and a valve member located in a blind bore in the portion of the differential piston which is of greater area, the valve member being adapted to be urged by a first light bias spring into engagement with a seating at the open outer end of the blind bore to cut-off communication between the two pressure spaces when the differential piston is moved relatively away from a stop at the adjacent end of the said one piston, and a second spring of substantial strength acts between the end of the differential piston which is of smaller area and a face at the adjacent end of the stepped bore. The differential piston is provided with spaced seals which are disposed at opposite ends of a radial port leading into the blind bore.

In order to accommodate the differential piston, the proportioning valve, and the second spring, the said one piston is of substantial length and in consequence, the actuator itself is similarly of substantial length.

According to our invention in an hydraulic actuator of the kind set forth for a vehicle internal shoe-drum brake one of the relatively movable parts comprises a first piston working a bore in a housing and the actuator incorporates a proportioning valve comprising a valve head for engagement with a seating, first and second stems projecting from the head and through the piston in each of two opposite directions, each stem being of an area smaller than that of the head, a seal between the first stem and the piston, a first spring acting between an abutment adjacent to the seal and a shoulder on the first stem to urge the head in a first direction away from the seating and into engagement with a stop, and a second spring acting on an enlargement on the second stem also to urge the head in the first direction and to augment the force in the first spring, the other of the said relatively movable parts being provided with a longitudinally extending recess into which the second stem and the second spring both project.

Constructing the proportioning valve with a single seal reduces friction to a minimum and accommodating at least a portion of one of the springs in another part of the actuator provides a compact assembly without the necessity of having to increase the effective length of the piston to accommodate the second spring. Providing the two springs enables us to use springs of relatively low rates and, by providing a threaded connection between one of the stems and the head we can adjust the loading on one of the springs, thereby adjusting the total spring force acting on the valve head.

When the said other relatively movable part comprises a second piston working in a common bore with the first piston, the second piston can abut directly against the first piston or against a partition fixed in the bore. When the two pistons abut, a compression spring may act to urge them in opposite directions at least with a force sufficient to hold them in engagement with shoe-ends. In such a construction the compression spring surrounds the second stem and is received in the recess in the second piston.

Three embodiments of our invention are illustrated in the accompanying drawings in which.

Figure 1:
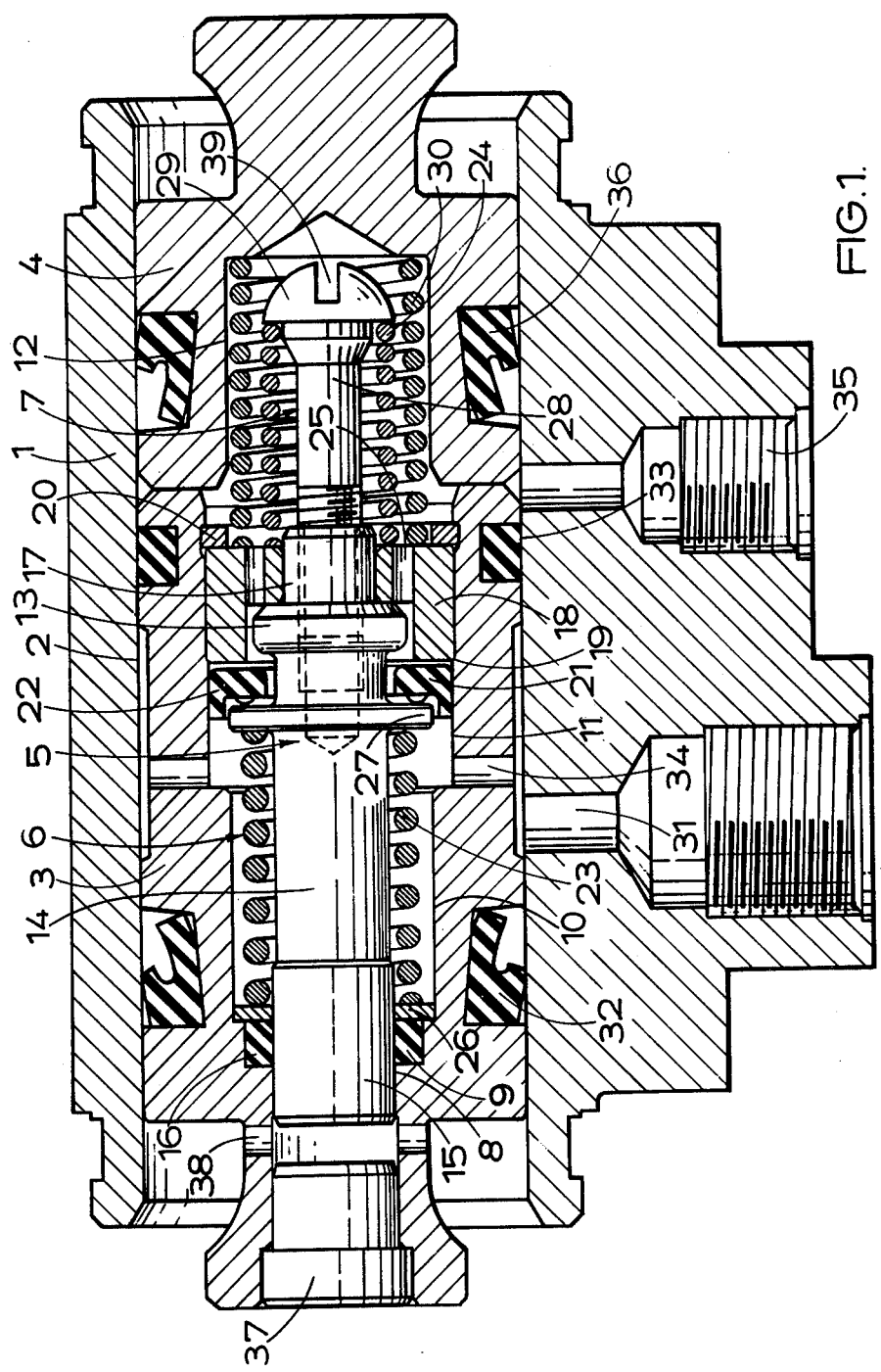
FIG. 1 is a longitudinal section through an hydraulic brake actuator incorporating a pressure proportioning valve.

The actuator shown in FIG. 1 of the drawings comprises a housing 1 which is adapted to be mounted on the back plate of a brake of the internal shoe-drum type between adjacent of pairs of leading and trailing shoes (not shown). The brake is used for braking a rear wheel of a vehicle. The shoes carry friction linings for engagement with a rotatable drum and at their nonactuated ends abut against fixed abutment surfaces on the back plate.

The housing 1 is provided with an open-ended longitudinally extending bore 2 of constant diameter throughout its axial length and in which work a pair of opposed first and second pistons 3 and 4 for co-operation at their outer ends with brake shoe-ends.

The first piston 3, which is of greater axial length than the second piston 4, incorporates a pressure proportioning valve 5 for controlling communication between first and second pressure spaces 6 and 7 defined in the housing on opposite sides of the proportioning valve 5.

The first piston 3 has an internal through bore of stepped outline having stepped portions 8, 9, 10 and 11 of which the diameters increase progressively from the outer portion 8 which is of smallest diameter to the innermost portion which is of greatest diameter.

The second piston 4 has an internally directed axially extending recess 12 of substantially the same diameter as that of the stepped portion 10.

The proportioning valve 5 comprises a head 13 which is carried at one end of a first stem 14 of substantial axial length. The stem 14 extends longitudinally through the bore of the first portion 3 and is provided with an outer end portion 15 which works through a seal 16 disposed within a groove 19 defined between the bore portions 8 and 10. On the opposite side from the end portion 15 the head 13 has an axial extension 17 of reduced diameter. The extension 17 is slidably received in a central opening in a seating support 18 which is fixedly retained in the bore portion 11 in abutment at its inner end against a small shoulder 19 at an intermediate point in the length of the portion 11 by a retaining ring 20.

An annular seating 21 of elastomeric material abuts against the inner end face of the support 18 which is remote from the ring 20 and the seating includes a radial skirt 22 having a sealing engagement with the bore portion 11.

A first compression spring 23 and a second compression spring 24 both act in the same direction, normally to urge the head 13 into a retracted position spaced from the seating 21 and in which it engages with a stop defined by the seating support 18 which is provided with angularly spaced apertures 25. The first compression spring 23 surrounds the stem 14 and acts between a retainer 26 for the seal 16 and a radial flange 27 on the stem 14. An example of such a seal is more specifically described in G.B. Patent Specification No. 1,159,876.

A second stem 28 screwed at its inner end into the extension 27 projects into the recess 12, and the second spring 24 abuts between the seating support 18 and an enlarged head 29 at the outer end of the second stem 28.

A third compression spring 30 acts between the two pistons 3 and 4.

In a normal "brakes off" inoperative position the head 13 is spaced from the seating so that both pressure spaces 6 and 7 are in communication with each other with an inlet port 31 in the wall of the housing 1 for connection to an hydraulic master cylinder. The port 31 is in communication at all times with the pressure space 6 through an annular passage in the wall of the piston 3, which is disposed between a pair of axially spaced seals 32 and 33, and a radial port 34 in the wall of the piston 3 between the seal 16 and the seating 21.

A port 35 in the wall of the housing 1 between the seal 33 and a seal 36 carried by the piston 4 is closed, being open only for system bleeding purposes.

When the master cylinder is operated fluid under pressure is supplied to a pressure chamber comprising both pressure spaces 6 and 7 and the pressure fluid acts on adjacent ends of the pistons 3 and 4 to urge them in opposite directions with the piston 4 acting directly on one shoe-end, and the piston 3 acting on the other shoe-end through a tappet 37. The tappet 37 is received in the outer end portion 8 of the bore, and radial ports 38 ensure that the adjacent outer end of the stem 14 is exposed to atmosphere. The spring 30 acts to hold the pistons 3 and 4 in contact with the shoe-ends.

The valve head 13 is held away from the seating 21 by the springs 23 and 24 until the pressure in the pressure chamber acting on the stem 14 increases to a value which is sufficient to overcome the combined forces in the springs 23 and 24. At this point the valve head 13 and the stems 14 and 28 start to travel in a closing direction until the head 13 engages with the seating 21 to isolate the pressure space 6 from the pressure space 7.

Further increase in the pressure from the master cylinder creates a force equal to this pressure acting over the area of the head 13 minus the area of the end portion 15, with the result that the head 13 is moved away from the seating 21 to permit the pressures in the two pressure spaces 6 and 7 to tend to equalise, whereafter the increased pressure in the space 7 will again cause the valve to close.

Thus any increase in the pressure from the master cylinder, after the proportioning valve has closed initially, will result in fluid under pressure being metered from the pressure space 6 into the pressure space 7.

The pressure in the pressure space 6 is the pressure of the inlet port 31 since the radial ports 34 provide permanent communication between the space 6 and the annular chamber between the seals 33 and 32 to which the inlet port 31 is connected directly. When the valve head 13 engages with the seating 21 the pressure in the space 6 ceases to have any effect of the output force from the piston 3. This output force is always entirely dependent upon the pressure in the space 7.

The head 29 is provided with a screw-driver slot 39 in that, upon removal of the piston 4, the stem 28 can be rotated relative to the head to adjust the loading of the spring 24 and, in consequence, the spring closing force of the proportioning valve 5.

Figure 2:
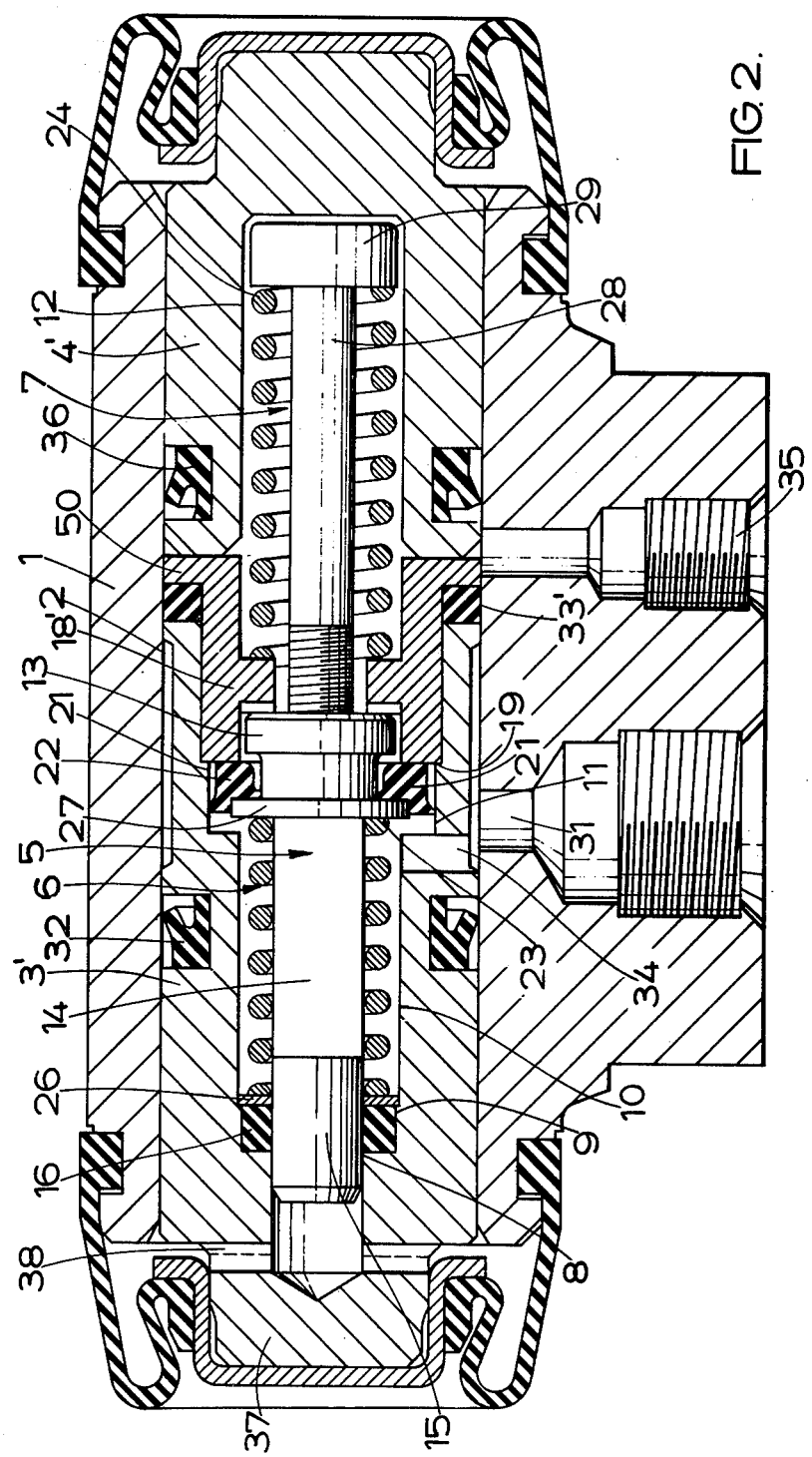
FIG. 2 is an actuator similar to FIG. 1 but showing a modification.

In the actuator of FIG. 2 the seating support 18' has a central aperture of substantial diameter and includes a radial flange 50 to define between itself and an adjacent portion of the piston 3' a recess for the seal 33'. The seating support 18' is firmly attached to the piston 3', being screw-threadably inserted into, or a tight fit within, a bore in the piston 3'.

The construction and operation of the actuator of FIG. 2 is otherwise the same of FIG. 1 and corresponding reference numerals have been applied to corresponding parts.

Figure 3:
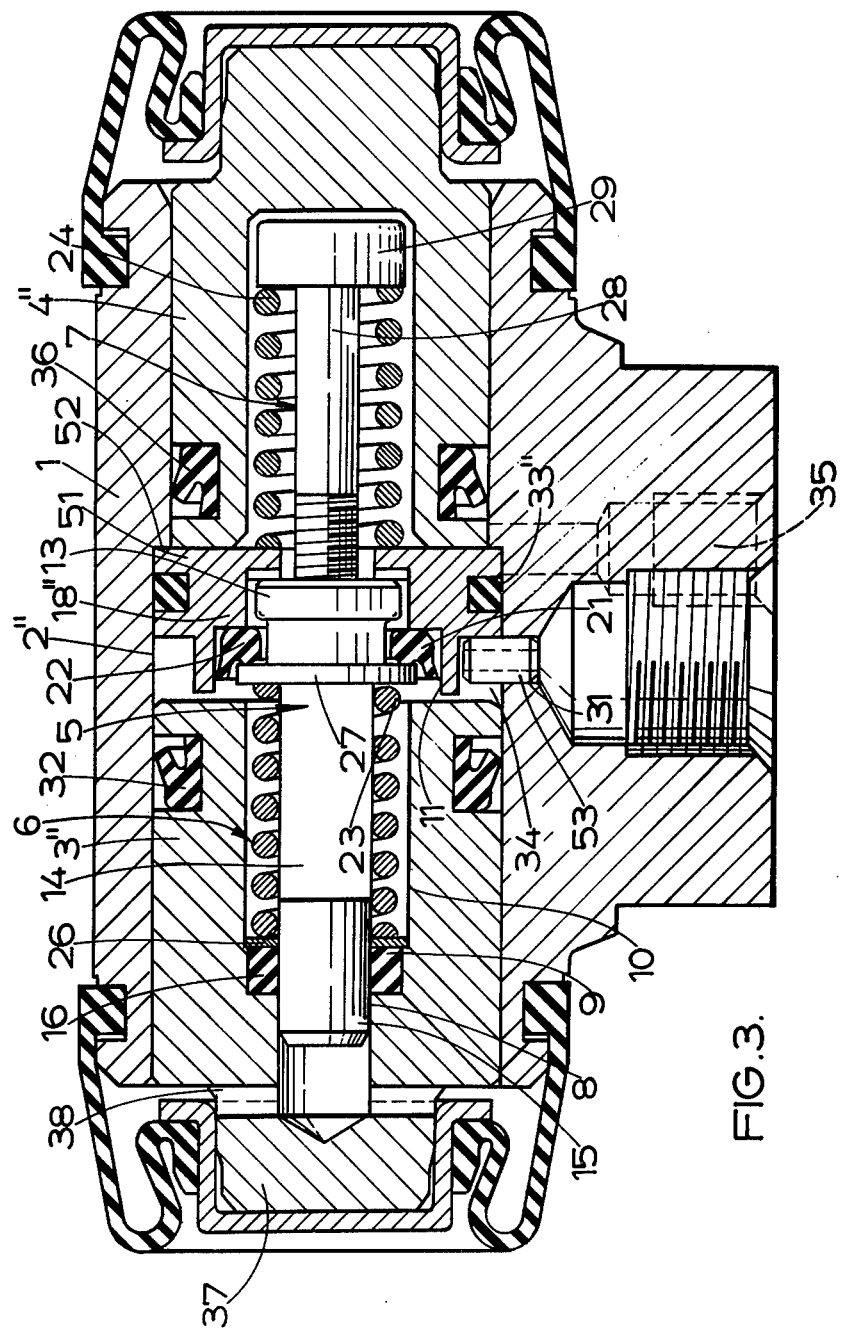
FIG. 3 is a longitudinal section through another modified actuator.

In the construction of FIG. 3 the seating support 18" comprises a partition 51 sealed in the bore 2" and held against a slight shoulder 52 at a change in diameter by means of a radial peg 53 which is received in the port 31 and is hollow to permit communication with the master cylinder. The seating 21 is carried by the partition, against which the piston 30 abuts.

In this construction the second piston 4 abuts against the partition 51 in an "off" position of brake.

The provision of the partition 51, and the pressure space 6 arranged between the partition 51 and the piston 3", permit the pressures in the chambers 6 and 7 to act separately on the pistons 3" and 4" respectively, thereby producing different output forces at the outer ends of the pistons 3" and 4", where they engage the ends of the respective trailing and leading shoes. The pistons 3" and 4" can thereby produce braking forces which differ in dependence upon the fluid pressure metering characteristics of the valve 5.

The construction and operation of the actuator of FIG. 3 is otherwise the same as that of FIG. 1, and corresponding reference numerals have been applied to corresponding parts.

We claim:

1. An hydraulic actuator for a vehicle internal shoe-drum brake, said actuator comprising a piston and cylinder assembly having relatively movable parts, said assembly having a housing, means defining a bore in said housing, and one of said relatively movable parts comprising a first piston working in said bore, means defining a pressure chamber in said actuator, fluid in said pressure chamber acting between said relatively movable parts to apply said brake, and said actuator incorporates a proportioning valve, said proportioning valve comprising a valve head for engagement with a seating, first and second stems projecting from said head in each of two opposite directions, at least one said stem projecting through said first piston, each said stem being of an area smaller than that of said head, said first stem being provided with a shoulder, and said second stem being provided with an enlargement, a seal located between said first stem and said first piston, an abutment adjacent said seal, a first spring acting between said abutment and said shoulder on said first stem to urge said head in a first direction away from said seating and into engagement with a stop, and a second spring acting on said enlargement on said second stem also to urge said head in said first direction and to augment the force in said first spring, and the other of the said relatively movable parts being provided with a longitudinally extending recess, said second stem and said second spring both projecting into said recess.

2. An actuator as claimed in claim 1, wherein a threaded connection is provided between one of said stems and said head whereby the loading on one of the springs and thereby the total spring force acting on said valve head, can be adjusted.

3. An actuator as claimed in claim 1, wherein the said other relatively movable part comprises a second piston working in said bore with said first piston.

4. An actuator as claimed in claim 3, wherein said second piston is adapted to abut against said first piston, and said seating is carried by said first piston.

5. An actuator as claimed in claim 4, wherein a compression spring acts between said first and second pistons to urge them in opposite directions.

6. An actuator as claimed in claim 5, wherein said compression spring surrounds said second stem and is received in said recess in said second piston.

7. An actuator as claimed in claim 3, wherein a partition is fixed in said bore, said seating being carried by said partition, and said second piston abuts against said partition.

* * * * *